Sept 10, 1957 M. SOUBRIER 2,805,862

METHOD AND MEANS FOR RECORDING CHIEFLY ON MAGNETIC CARRIERS

Filed March 18, 1952 4 Sheets-Sheet 1

INVENTOR
Maurice Soubrier
By George Hlorey
ATTORNEY

INVENTOR
Maurice Soubrier
By George H. Corey
ATTORNEY

Sept 10, 1957 M. SOUBRIER 2,805,862

METHOD AND MEANS FOR RECORDING CHIEFLY ON MAGNETIC CARRIERS

Filed March 18, 1952 4 Sheets-Sheet 3

Fig. 4

| | 1 | 2 | 3 | 4 | 5 | 6 | 7 | 8 | 11 | 12 | 13 | 14 | 15 | 16 | 17 | 18 | 19 | 20 |
|---|---|---|---|---|---|---|---|---|---|---|---|---|---|---|---|---|---|---|
| FIRST RECORDING ON B I | + | | + | + | + | + | | | + | | | | | | | | | |
| ORIGINAL REWINDING II | | + | | | | | + | + | | | | | | | | | | |
| READING III | + | | + | + | + | + | | | | | + | | | + | | + | | |
| REARWARD MOTION IV | | + | + | + | | | + | + | | | | | | | + | | + | |
| DICTATION ALTERATION V | + | | + | | + | | | | | + | | | | | | | | |
| ERASING VI | + | | | + | | + | | | | | + | | | | | + | | |
| BLURRING VII | + | | + | + | + | + | | | | | + | | | + | | + | | + |
| FINAL REWINDING VIII | | + | | | | | + | + | | | | | | | | | | |
| FINAL READING IX | + | | + | | + | | | | | | | | + | | | | | |

Fig. 5

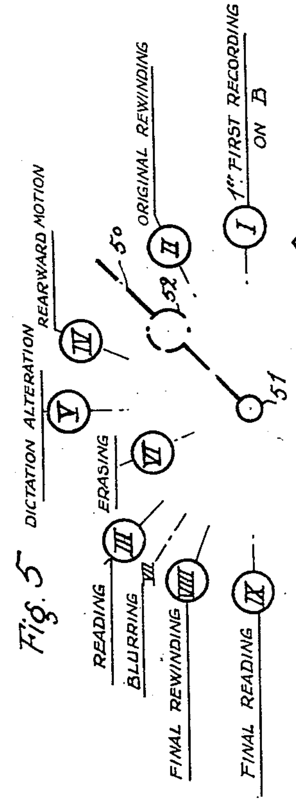

INVENTOR
Maurice Soubrier
By George H. Corey
ATTORNEY

Sept 10, 1957 M. SOUBRIER 2,805,862

METHOD AND MEANS FOR RECORDING CHIEFLY ON MAGNETIC CARRIERS

Filed March 18, 1952 4 Sheets-Sheet 4

INVENTOR
Maurice Soubrier
By George Harvey
ATTORNEY

United States Patent Office 2,805,862

Patented Sept. 10, 1957

2,805,862

METHOD AND MEANS FOR RECORDING CHIEFLY ON MAGNETIC CARRIERS

Maurice Soubrier, Paris, France

Application March 18, 1952, Serial No. 277,238

Claims priority, application France March 28, 1951

5 Claims. (Cl. 274—4)

In spite of the recent improvements in the art of recording on so-called magnetophone wires and strips, it may be remarked that a text, a speech, a report or any other dictated matter when recorded on a carrier (wire or strip) cannot readily, if at all, be modified as may generally be desirable. It is possible, it is true, to wipe out certain passages, but there are often no means for an accurate and convenient control of the location of the erased portion which forms an objectionable blank in the record. Furthermore, it is impossible to insert an alteration in the record otherwise than at the location of an erased part without it being possible in such a case to ascertain whether this location will be actually long enough for the inset contemplated. Moreover, in a text that is to be copied by a typist, the author or other dictating person may wish sometimes to insert to the attention of the latter remarks relating to the general appearance of the typed copy, to the page setting, etc.

In order to overcome these drawbacks, my invention covers a recording machine that allows cutting out or altering as required of various passages in a record without this producing any gap on the final record: It is also possible to insert any number of passages of any length in any desired sequence and finally to insert when the record is finished all the remarks or directions that may be required for the typing of the matter or for any like purpose, these different operations being performed automatically through simple actuation of a control member.

A more specific object of my invention consists in a mechanical control that is extremely simple and that offers however a high reliability in the operation of the machines considered.

A still further object of my invention consists in the execution of control means operating possibly from a distance whereby it is possible to make the operation of the machine according to my invention as easy as that of an ordinary machine while cutting out the possibility of faulty handling.

A more general object of my invention consists in a system for recording a signal of any kind whatever, that is applicable to any reversible system for recording on a record carrier, said method providing means for touching up, completing, altering and cutting out portions of a record without any gap appearing thereby in the latter.

The method according to the invention will be disclosed more particularly in its application to the recording of sound on a magnetic carrier, but nothing prevents in principle its general application to other recording systems, provided the latter is reversible, which is however not the case in the present state of the technique of photographic recording for instance, which is not reversible because it is not possible to erase or wipe it out.

The machine according to my invention includes in combination two conventional groups comprising each a recording head, a wiping out head and a reading head, means allowing two wire or strip carriers to unwind in front of the corresponding groups, simultaneously or separately as desired, means for connecting a microphone with either of the recording heads as desired, means for connecting a sound diffusing instrument with either of the reading heads as desired, and means for connecting the recording head of one group with the reading head of the other group or reversely.

By reason of this arrangement, it becomes possible to record for instance a first draft on one of the carriers, to transfer it onto the other support as the reading of said draft is proceeded with and only insofar as it is found acceptable upon reading, while cutting out or correcting as desired certain passages without producing any discontinuity in the final record, to provide insets, the number, length and sequence of which may be selected at will and also to insert subsequently any directions that may be required during the ultimate copying work, all these operations being performed automatically through mere operation of a control member.

There may be thus established a sort of rough draft or outline sketch on the first carrier and it is then possible to proceed with the execution of a clear copy on a second carrier while introducing therein all the desired amendments.

During this execution of a clear copy, the rough draft will be preferably wiped off the first carrier gradually as it is being transferred onto the second carrier, this procedure being moreover completely reversible through mere reversal of the direction of progression of the carriers on one hand and through a shifting of the interconnection between the recording and reading heads in the two groups into opposite relationship, on the other hand.

According to a modification, the dictation on the first carrier may be retained in its original shape over a certain portion of its length, only the portion to be amended being transferred onto the other carrier so that it may be submitted to the desired alteration.

In addition to the complete wiping out of any passage, the invention also provides for the possibility of erasure through the superposition of a suitable signal such as a buzzing, an acoustic ticking or the like, which leads to the advantage of retaining for instance if required a recorded numerical information while warning the typist that this information is not to be copied.

The independent or simultaneous mechanical control of the two carriers may be obtained easily. Thus, according to a preferred embodiment, such a control may be produced by a single motor running at a constant speed through the agency of a system including a driving drum and a synchronizing drum coupled permanently with said motor, a member driving frictionally each of the feed and take up spools operating with each of the two carriers, means for engaging as desired any of said members with said driving drum and friction rollers provided for the engagement of one or both carriers against the synchronizing drum when required. The different operative steps (reading, dictation, wiping out, etc.) imply simply different positions of the above defined clutching or engaging means, which latter are preferably submitted to an electromagnetic control energized by means of switches controlled by the location of a selecting member defining simultaneously for each of its positions the location of the different switches of the electronic section of the machine.

As will be apparent hereinafter, a suitable choice of the selecting member allows the handling of my machine in a manner as easy as with any ordinary machine, while cutting out any faulty operation.

A more general object of my invention is constituted by the recording method that is characterized by the fact that it includes in succession the following operative steps:

Impression on a first carrier of a sketch or outline of the matter to be recorded;

Reading of this sketch or outline with a transfer thereof onto a second carrier while it is being wiped off the first carrier;

With a view to marking any passage to be removed, reversal of the preceding operation, return transfer onto the first carrier while the recorded matter is being wiped off the second carrier after which said passage is read and wiped off the first carrier without any transfer onto the second carrier;

With a view to the insertion of a new passage: impression of this new passage on the second carrier only.

Generally speaking, these operations may be completed by a similar transfer from the first carrier onto the second carrier with a reading and a wiping off of the recorded matter from the first carrier and with the addition however thereto of the superposition onto said second carrier of a special distinctive signal over an undesired passage.

The invention will be better understood through the reading of the following description of an embodiment selected by way of example, reference being made to accompanying drawings, wherein:

Fig. 4 is a chart giving out the location of the different mechanical and electrical members for various operative positions.

Fig. 5 illustrates diagrammatically a possible arrangement of the selective control member.

Figures 1, 2:
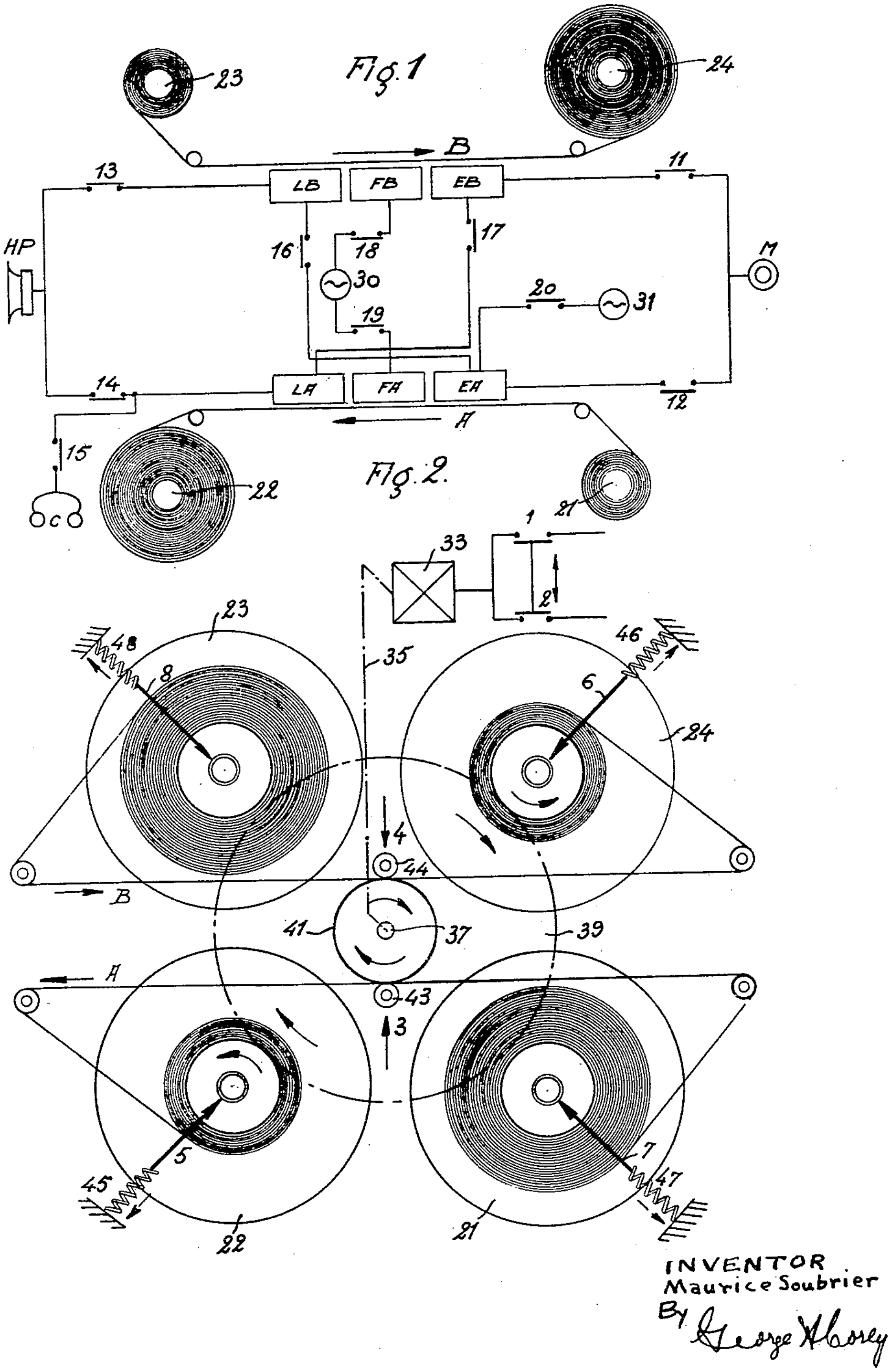
Fig. 1 is a diagram of the electronic section of a machine according to the invention.
Fig. 2 is a diagrammatic illustration of a possible manner of executing the mechanical section of said machine.

According to the embodiment selected and illustrated, there are used simultaneously two similar magnetic carriers that may be indifferently constituted by wires or by strips and that will be termed hereinafter respectively "wire A" and "wire B." Referring to Fig. 1, it is apparent that the wire A is fed by the feed spool 21 onto a take up spool 22, said wire passing in succession in front of a recording head EA, of a wiping out head FA and of a reading head LA. In a similar manner, the wire B unwinds during normal operation from a feed spool 23 onto a take up spool 24 and passes in succession in front of a reading head LB, of a wiping out head FB and of a recording head EB. The three heads associated with each wire have been illustrated separately for sake of clarity of the disclosure and of the drawing, but they may obviously be associated in accordance with a well known technique. It is supposed furthermore that they are connected with suitable amplifiers. These amplifiers should be established with the utmost care so as to reduce the distortion as much as possible and to allow thus the execution of a comparatively high number of successive reproductions. A microphone M may be connected as desired with either of the recording heads EA—EB by closing the switches designated respectively by 12 and 11. Similarly, either of the reading heads LB and LA may be connected with a loud speaker HP through closing of the corresponding switch 13 or 14. The reading head LA may furthermore be connected by at switch 15 to a headphone C. A characteristic feature of the connections consists in the interconnection provided between the reading head of each carrier and the recording head of the other, this interconnection being performed respectively through the switches 16 and 17. The wiping out heads FA—FB may be connected when desired and in a conventional manner with a supply 30 of a wiping out current at supersonic frequency. Lastly, the recording head EA may be connected through a switch 20 with a supply 31 of blurring signals. This supply may be constituted simply by a shunt on the alternating current mains in which case the blurring signal will produce a buzzing noise, or by a pulse generator in which case the blurring signal is constituted by a series of pips succeeding one another at a predetermined rhythm.

Fig. 2 is a diagrammatical showing of a possible embodiment of the mechanical section in which the progression and the winding movements of the carriers may be obtained through a single motor 33 that is supposed to be capable of rotating in two opposite directions according as to whether it is fed by either of the contact pieces 1—2 of a reversing switch. This motor is preferably of the synchronized asynchronous type and it drives through a suitable transmission 35 a main shaft 37 to which is keyed a driving drum 39 and a so-called synchronizing drum of a smaller diameter 41. The two wires AB pass to either side of and in proximity with this synchronizing drum and may be urged against the latter by corresponding friction rollers 43, 44. It will be supposed that these friction rollers that are held normally spaced away from the synchronizing drum by elastic means may be urged on the contrary into contact with the synchronizing drum through electromagnetic control means that have been illustrated diagrammatically by the corresponding arrows 3 and 4. The wire feed spools 21 and 23 on one hand and the wire take up spools 22 and 24 on the other hand are distributed in star formation round the driving drum 39. Each spool spindle is urged elastically away from the driving drum 39 but it may be moved separately towards the latter by means of an electromagnetic control illustrated diagrammatically by the arrows 5 and 6 for the take up spools and the arrows 7 and 8 for the feed spools of the wires A and B.

I have designated furthermore respectively by 45, 46 and 47, 48 the springs that urge the spindles of the spools 22—24 and 21—23 away from the take up drum 39 while engaging said spools against brakes that are not illustrated.

The engagement with the driving drum 39 is executed through the agency of sleeves frictionally drawn along through contact with the said driving drum 39 and driving also frictionally in their turn the spindle of the corresponding spool insofar as the latter is not braked by other means.

The operation of this mechanism is as follows:

In the case illustrated, it is supposed that the main shaft 37 revolves and carries along with it the drums 39 and 41 in a clockwise direction and that the two friction rollers 43 and 44 are thus held fast while the electromagnetic control means 3 and 4 are energized. It has been supposed furthermore than the two take up spools 22 and 24 are in engagement with drum 39 through a closing of the switches feeding the electromagnetic control means 5 and 6. The spindles of these spools are carried along by the sleeves coupling them with the drum 39 whereby these spindles revolve in the direction of winding i. e. anti-clockwise. These spindles are however braked because the wires that are held fast by the friction rollers urging them against the synchronizing drum 41 can progress only at a speed equal to the peripheral speed of this synchronizing drum which corresponds to the desired speed of progression of the carrier wires. The two wires A and B are thus wound at the predetermined speed of progression.

If it is desired to wind at a high speed the wire A for instance, it is sufficient to release to this end the friction rollers 43 by opening the switch feeding the electromagnetic means 3. The spindle of the spool 22 is no longer braked and its rotation may consequently accelerate gradually until it reaches a higher speed corresponding to its actual drive without any substantial slip, as provided by the driving drum. To stop this winding movement, it is sufficient to open the switch feeding the electromagnetic control means 5. The spring 45 urges then immediately the spool 22 against its braking device that is not illustrated.

For the rewinding movement, i. e. rearward spooling, it is sufficient to reverse the direction of rotation of the motor by closing the switch 2 instead of the switch 1 and to actuate the electromagnetic control means 7 and 8 of the corresponding feed spools 21 and 23.

Concerning the electronic section, it is sufficient to remark that its actual operation allows recording on either of the wires A and B, the reading of either record and the transfer of the record from either carrier onto the other.

These possible operative steps are resorted to in succession in the application of the arrangement to the execution of the invention, as will be disclosed hereinafter.

Figure 3:
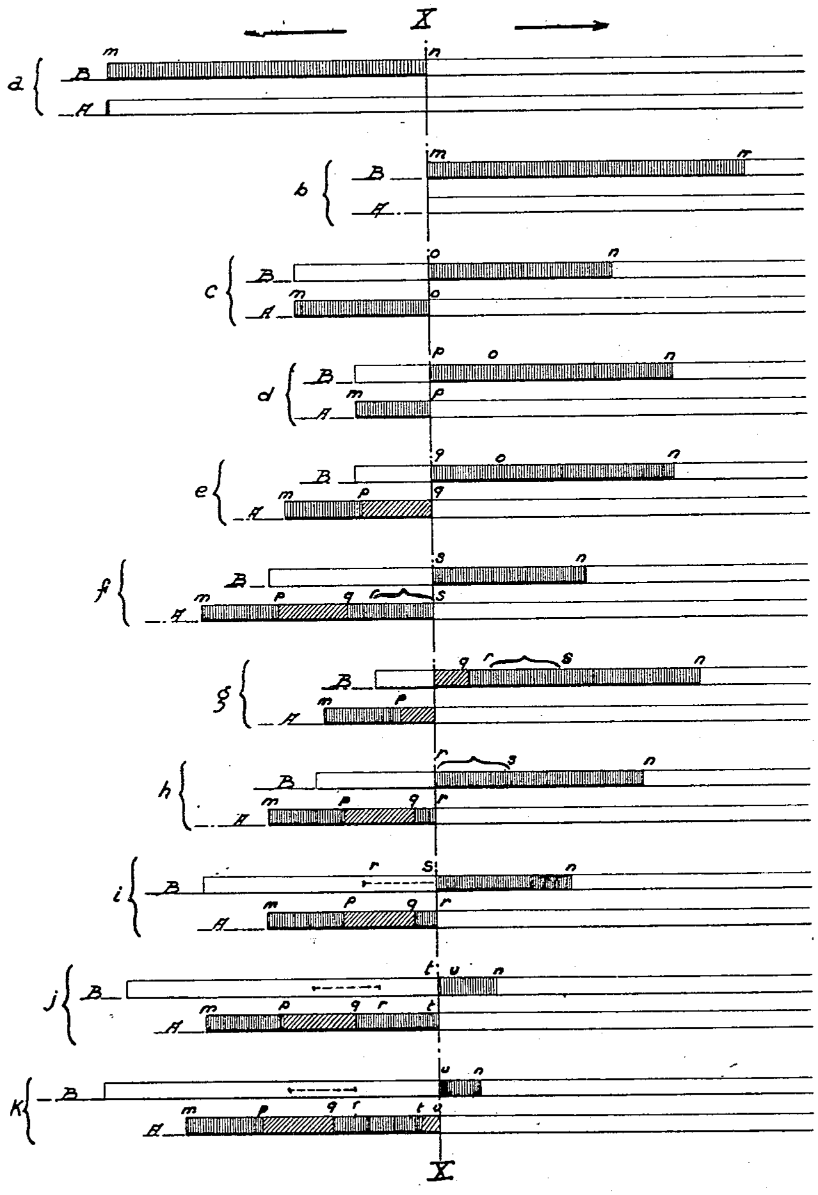
Fig. 3 is an explanatory diagram of the successive stages of operation.

In Fig. 3, I have illustrated diagrammatically the two wires A—B in their relative positions with reference to the systems of heads, the location of which is indicated by the dot and dash line X—X. It is supposed for the purpose of illustration in this diagram that the direction of progression is the same for both wires although actually they move in opposite directions in the embodiments of Figs. 1 and 2. The chart of Fig. 4 indicates furthermore for the different successive positions of the control member the location of the different control means on one hand for the mechanical section (references 1 to 8) and for the electric section on the other hand (references 11 to 20). The active position of a controlling part or the closed position of a switch is indicated by a cross in this chart.

I proceed first (position I of the selective control member) with a first recording that may be considered as a "rough draft" and which is executed on the wire B which is accompanied in its progression by the wire A. During this operation, it is apparent, as shown in Fig. 4, that the motor is fed by the switch 1 providing for forward movement, that the two friction rollers 3 and 4 are held fast over the synchronizing drum so that the wires move at the speed of normal progression and that the electric control means 5 and 6 are operative so as to drive the take up spools 22 and 24 (Fig. 2). On the other hand, in the electronic section, only the switch 11 is closed and consequently the microphone M (Fig. 1) is connected with the recording head EB operating on the wire B. At the end of this first recording, the two carriers are located in the position *a* of Fig. 3. The recorded text is shown by vertical hatchings on the wire B and extends from the starting point *m* towards the terminal point *n*.

The following stage (position II) consists in the speedy original rewinding of the two wires intended to return them without loss of time into the starting position indicated at *b* in Fig. 3. As illustrated by the second line of the chart of Fig. 4, the motor rotates now in the opposite direction through a closing of the switch 2 instead of 1 and consequently the feed spools will be now in engagement with the driving drum through energization of the electromagnetic control means 7 and 8. The rewinding is speedy as the control means 3 and 4 are inoperative and the two wires pass freely in front of the synchronizing drum. All the switches 11 to 20 are open in the electronic section.

This is followed by a checking of the record that has been made. The control member is shifted onto the position III, "Reading," in order to listen to the recorded matter. The mechanical section is now again in a position similar to that of the first stage and the two carriers move again at the speed of progression. But as shown by the right hand side of the chart (Fig. 4), the switch 13 now connects the loud speaker with the reading head LB associated with the wire B and at the same time the switches 16 and 18 are closed, whereby the voice currents produced by the reading head LB are fed to the recording head EA and the record is transferred as it is being read from the wire B onto the wire A and is immediately afterwards wiped out from the wire B. Fig. 3 shows at

*c* the position of the two wires during the execution of the reading when the transfer operation has been going on for some time. The first portion of the record *mo* has been transferred onto the carrier A while the remainder *on* is still on the carrier B.

It will be supposed now that it is desired to introduce an inset into the body of the portion *mo* of the record, i. e. to introduce a few words or a supplementary passage. It is necessary to return the wires rearwardly up to the exact point at which the inset should be introduced. This return movement (position IV) is performed at the speed of normal progression and while the record is being transferred from the carrier A back onto the carrier B. Examination of the chart shows as a matter of fact that the motor revolves in the opposite direction as provided by the closing of the switch 2, the friction rollers are held fast through actuation of 3—4 and the feed spools are driven by reason of the actuation of 7—8. In the electronic section, the wire A passes then in front of its reading head LA which is connected with the opposite recording head EB through the closing of the switch 17 so that the transfer is performed before the head FA, which is connected with the source of wiping out current 30 through a closing of the switch 19, wipes out the record off said wire A. The position *d* illustrated in Fig. 3 is now reached that corresponds to the point *p* of the record at which it is desired to introduce the inset. Generally speaking the operator will of course move the carrier beyond this point somewhat nearer the beginning *m* of the record and he will return the control member into the position "Reading" so as to locate exactly the point of insertion by listening to the record.

This being done, the operator shifts the control member into the position V, "Dictation and Alteration." In this position, the carrier A moves alone at the speed of normal progression. The motor revolves in the forward direction through closing of the switch 1 and only the carrier A is urged against the synchronizing drum by reason of only control means 3 being energized and only the take up spool 22 of the carrier A is in engagement through energizing of control means 5. In the electronic section, the microphone M is connected with the recording head EA as provided by the switch 12. The alteration having been dictated, the location of the carriers is shown at *e* in Fig. 3 in which the alteration *pq* illustrated by sloping hatchings is positioned at the end of the first part *mp* of the record.

The operator returns then the control member into the Reading position and continues listening to the following portion of the record which is wiped off the carrier B gradually as it is transferred onto the carrier A. It is apparent that a portion *rs* of the record has now become useless by reason of the introduction of the passage *pq* so that this portion should be cut out. The carrier wires are now in the position *f* (Fig. 3). The operator returns into the position Rearward Motion IV and remains in this position until the carrier wire has brought into register with the heads an intermediary point of the alteration *pq* for instance (position *g* of Fig. 3). The operator returns into the Reading position and continues listening to the record and stops at the exact point *r* at which the passage to be wiped out begins (position *h*). The operator at this moment passes into the Erasing position VI so as to wipe out this passage. In this position, the motor revolves forwardly as the switch 1 is now closed and only the carrier B advances, the control means 4 and 6 being energized. In the electronic section, the switch 13 being closed, the loud speaker is connected with the reading head LB and the source 30 of wiping out current feeds the wiping out head FB by closing switch 18. The desired wiping off the carrier is performed while the operator listens to the passage to be wiped out.

This operation is stopped at the point *s* corresponding to the position *i* of Fig. 3.

The operator returns to the "Reading" position and while listening to the point *t* (position *j*), he finds a passage *tu* that it is desired to detach from the record that is being transferred without wiping it out completely. It is now blurred by shifting the control member into the position VII, "Blurring." In this position, the operative steps are the same as in the "Reading" position, to wit, wiping off the wire B and transfer onto the wire A, but the head EA is furthermore connected with the source of blurring signals 31 through the closing of the switch 20. The passage *tu* is transferred onto the carrier A with a superposition over it of the blurring signals provided by the source 31.

I have thus disclosed the various occurrences that may appear and I will now suppose that the reading with a transfer onto the carrier A continues thenafter without any further incident up to the end, when the record is definitely and completely transferred onto the carrier A and wiped off the temporary carrier B. Obviously the above described incidents in the reading may be repeated and the machine may face any difficulties that are liable to appear. It is possible to insert as many alterations as desired, to erase or to blur passages, to give indications relating to the appearance of the typed text, etc.

The record thus corrected and amended forms in brief a clear copy without any gap in the wire A.

It is sufficient to rewind then at a high speed the wire A (position VIII), Fig. 4, so that it may be ready for use. In principle, the wire B may be wound again at the same time. This has been illustrated in Fig. 4 (position VIII) as the control means 7 and 8 are supposed both to be energized. Of course, it is possible to provide an individual control for the clutches operated by these control means in order to duplicate the action of the general control member providing for the duplication of the different positions I to IX as disclosed hereinafter, so as to allow the individual stopping of the wire B for instance, if it is completely unwound before the wire A. When using the finished record, it is sufficient to make the wire A unwind alone (position IX, Fig. 4). It has been supposed that this is performed by a typist listening through a head-phone, only the switch 15 being closed in the electronic section so as to connect the head-phone C with the reading head LA.

The control of the different positions may proceed in various manners known per se and shows no difficulty. It may be provided by different keys, for instance, that operate on the corresponding control means in accordance with the chart of Fig. 4. It may be obtained also by means of a selecting lever as illustrated diagrammatically in Fig. 5.

According to this last mentioned arrangement, a lever 50 rotatably carried by a spindle 51 carries a sliding knob or handle 52. The different operative positions are obtained on the other hand by depression of the pusher members I to IX, except the blurring position VII that is controlled by a special push button VII located near the location of the pusher member III for "Reading." One or more pusher members such as the pusher member VI, "Erasing," for instance may be located at a radial distance from the spindle 51 that is different from the others.

Each position being clearly identified by means of a suitable mark and an inscription, the operator proceeds first with the selection of the desired position by bringing the lever 50 into register with the mark and then the knob 52 thereon into register with the pusher member corresponding to said desired position and then the operator depresses said pusher member so as to provide the desired operation. Of course, the knob 52 may be locked in its operative position, wherever this is useful, through an interlocking device of the ball thrust, bayonet or the like type for instance, this being performed if required e. g. for the position of dictation or of reading. The passage through the positions Erasing or Dictation and Alteration is generally transient and still more in the case of the passage through the position Blurring. It is for this reason that the position Blurring at VII is obtained preferably by a single push button located near the position of the lever corresponding to the reading position as the blurring distinguishes from the reading only through the closing of the switch 20.

The arrangement of the positions of the control lever such as those illustrated in Fig. 5 seems particularly rational as it is capable of reducing to a minimum the number of operative steps and also of possible errors and, consequently this makes the training of the operator easy and even substantially instantaneous.

The radial shifting of certain positions such as the position VI makes faulty operation still less probable.

Of course, instead of the arrangement disclosed including pusher members, I may also use selecting devices including brushes movable over stationary sectors or reversely, multipolar switches, etc.

Figure 6:
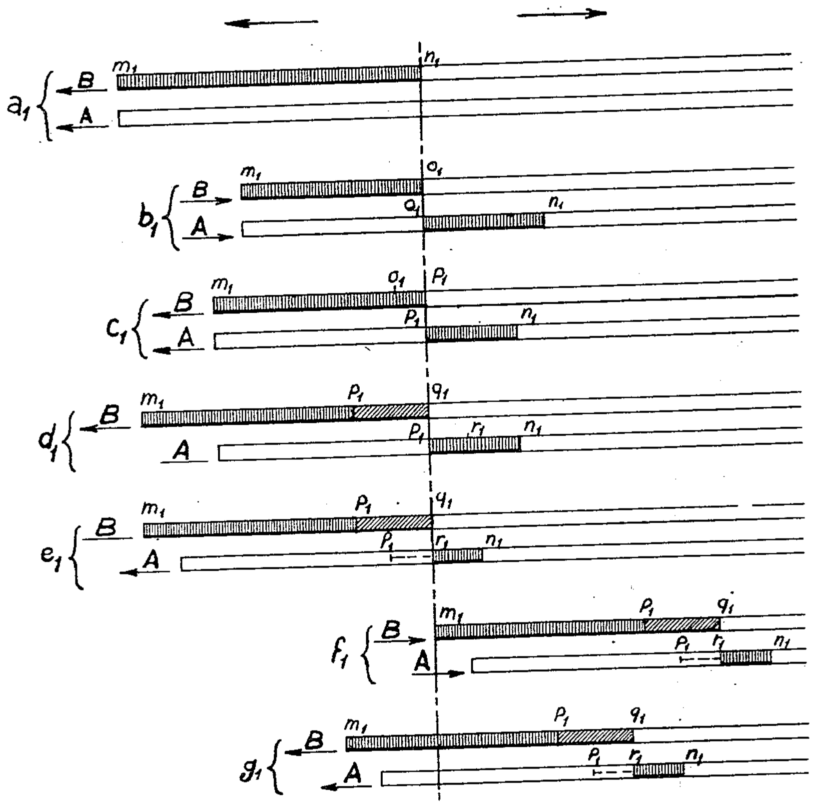
Fig. 6 is a diagram similar to that of Fig. 3 and relating to a modification.

Instead of the method and applications that have been described in detail hereinabove, it may be preferable in certain cases, chiefly in the case of office work, to resort to a somewhat simpler arrangement that will be disclosed with reference to the diagram of Fig. 6.

I begin here again by producing a preliminary record on the wire B for instance (stage *a*1) but instead of returning thereafter to the beginning of the record as in the preceding case, I execute during the second stage *b*1 a rearward movement with a transfer onto the wire A only until the point is reached that it is desired to examine or to alter. I stop for instance at the point *o*1 of the record. As this rearward motion is performed obviously without any reading, it is necessary to check the location as provided by the stage *c*1. To this end, there is proceeded with a reading on A together with a transfer onto B. The reading is thus proceeded with from *o*1 up to *p*1 which it is supposed to be the point at which a passage is to be introduced into the record as shown in the stage *d*1 of Fig. 6. The insert passage is dictated at *p*1*q*1 on the carrier B which progresses alone while the carrier A is stationary. If, as a consequence of this insertion a passage *p*1*r*1 is now useless, it should be wiped off the carrier A while the carrier B is stationary and the reading and wiping out are performed consequently on A (stage *e*1). These operations may be repeated as many times as may be required and once they are at an end, I proceed with a final rewinding at a high speed of both wires or carriers (stage *f*1). Lastly, the final reading (stage *g*1) may be executed in a simple manner by a simultaneous listening to the record on both wires which carry each a portion of the record.

It is not necessary to describe in detail the control system that serves for the execution of the various operations as this system may be readily imagined on the analogy of the preceding disclosure. The diagrams of Figs. 1 and 2 contain all the parts required for the execution of the modification, except for the simultaneous reading on both wires corresponding to the final reading stage *g*1 for which it is sufficient to provide a simultaneous connection of the head-phone C with the reading head LB and with the reading head LA. The stage *a*1 is identical with the stage *a* of Fig. 3 and it is obtained through the corresponding position I of the control system. The stage *b*1 corresponding to the stage *d* of Fig. 3 is obtained through the position IV of the control system with a closing of the switches 16 and 18 instead of the switches 17 and 19. Similar arrangements are readily apparent for the different subsequent stages.

This last disclosed modification shows certain advantages inasmuch as it cuts out the necessity of returning to the beginning of the record. It allows the operator to avoid listening for the starting point which may sometimes be difficult to find and it allows also carriers in the machine to be left in any position whatever after the dictation without this leading to any inconvenience.

Various applications of my method will be readily ascertained that are immediately capable of rendering valuable services, not only in office work or for teaching purposes as more particularly considered in the beginning of the specification, but also for instance in the case of the so called cuttings with which it is often necessary to proceed with for broadcasting, in particular in the case of the delayed transmissions of productions of any kind (reports, speeches, plays to be broadcast, etc.). It is a well known fact that these cuttings which are performed much oftener than the listeners imagine are executed nowadays by means of a tedious cutting out and pasting together of the record strips which leads to a considerable loss of time, not to mention the waste of strip material. It is admitted furthermore that such operations require a quite considerable skill and can be entrusted only to highly experienced and specially trained technicians.

The method according to my invention completely removes such difficulties and the cutting is executed on the second or final carrier which provides easy means for touching up, correcting, cutting out, adding insets or the like. This does not hinder the continuity of the record nor the maintenance of the integrity of the carrier which it is no longer necessary to cut and paste together. A fundamental advantage resides in the permanent control obtained by the reading, not only of the matter to be transferred onto the final carrier but also of the matter to be wiped out, this being performed gradually with the transfer and wiping out steps. It is possible to reliably begin and end the wiping out step for instance exactly at the beginning and at the end of the passage to be omitted while the same operation implies of necessity great care, when it is to be performed through cutting out as practised formerly and can generally be ensured only through successive approximations.

The method that has just been defined is capable of adaptation to any system recording a signal of any nature, provided only the procedure of impression of the signal on the record carrier is reversible. This is not the case, in the actual state of the technique of photographic recording for instance, which is not reversible as it is not erasable.

An interesting application of the method may be found however in the present kinematographic technique with a view to the execution of sound tracks chiefly those of the films obtained through "dubbing" in which the spoken part of an original film is reproduced in a different language. The execution of such an operation is made delicate by the difficulty of synchronizing the speech with the movements of the lips of actors speaking a different language. Consequently a satisfactory dubbing requires many trials that are expensive both as concerns the loss of time and the waste of film material produced thereby.

In contradistinction, the method according to the invention is easy to perform inasmuch as it consists in executing an outline of the sound portion accompanying a given picture film, perfecting this outline until a satisfactory adaptation to the pictures is obtained and transferring only then the perfected sound portion, after it has received all the desirable touching up, onto the sound track of the actual film. The possibility of superposing a distinctive signal on the second carrier may be resorted to in the operations known as noise production, mixing and the like.

What I claim is:

1. A method for producing a continuous and corrected recording of erasable signals on a single carrier comprising moving a first carrier in a predetermined direction of progression, impressing a preliminary record on said first carrier during said progression, subsequently moving said first carrier in said predetermined direction of progression, reading said preliminary record during said subsequent movement, simultaneously moving a second carrier in a predetermined direction of progression with said subsequent moving of said first carrier, transferring of said record to said second carrier and erasing from said first carrier of the preliminary record during said reading and simultaneous moving of said carriers, simultaneously reversing both carriers relative to their predetermined progression, retransferring to said first carrier and erasing from said second carrier of a correcting portion of the record during said reversing, simultaneously moving said carriers a second time in said predetermined directions, retransferring a second time to said second carrier and erasing from said first carrier of a chosen fraction of said correcting portion, intermittently stopping said second carrier only during any simultaneous moving of said carries to thus erase any undesirable part of said record from said first carrier without transfer to said second carrier, and intermittently stopping said first carrier only during any simultaneous movement of said carriers and directly impressing any alteration or insert onto said second carrier while said first carrier is stopped, wherefore a continuous and corrected recording is impressed on said second carrier and any recording on said first carrier has been simultaneously completely erased.

2. A method for producing a continuous and corrected recording of erasable signals on a single carrier comprising moving a first carrier in a predetermined direction of progression, impressing a preliminary record on said first carrier during said progression, subsequently moving said first carrier in said predetermined direction of progression, reading said preliminary record during said subsequent movement, simultaneously moving a second carrier in a predetermined direction of progression with said subsequent moving of said first carrier, transferring to said second carrier and erasing from said first carrier of the preliminary record during said reading and simultaneous moving of said carriers, simultaneously reversing both carriers relative to their predetermined progression, retransferring to said first carrier and erasing from said second carrier of a correcting portion of the record during said reversing, simultaneously moving said carriers a second time in said predetermined directions, retransferring a second time to said second carrier and erasing from said first carrier of a chosen fraction of said correcting portion, intermittently stopping said second carrier only during any simultaneous moving of said carriers to thus erase any undesirable part of said record from said first carrier without transfer to said second carrier, intermittently stopping said first carrier only during any simultaneous movement of said carriers and directly impressing any alteration or insert onto said second carrier while said first carrier is stopped, and superimposing a distinctive signal at any desired location of said record on said second carrier, wherefore a continuous and corrected recording with added signals is impressed on said second carrier and any recording on said first carrier has been simultaneously completely erased.

3. A method for producing a continuous and corrected recording of erasable signals on a single carrier comprising moving a first carrier in a predetermined direction of progression, impressing a preliminary record on said first carrier during said progression, subsequently moving said first carrier in said predetermined direction of progression, simultaneously moving a second carrier in a predetermined direction of progression with said subsequent moving of said first carrier, transferring of said record to said second carrier and erasing from said first carrier of the preliminary record during said simultaneous moving of said carriers, simultaneously reversing both carriers relative to their predetermined progression, retransferring to said first carrier and erasing from said second carrier during said reversing, intermittently stopping only the carrier being erased and simultaneously impressing an insert directly onto the carrier being recorded on, and intermittently stopping only said carrier being recorded on to thus erase any undesirable part of said record from said carrier being erased without transfer to said recording carrier, wherefore a continuous and corrected recording is impressed on one of said carriers and any recording on the other carrier has been simultaneously completely erased.

4. A machine for producing a continuous and corrected recording of erasable signals on a single carrier comprising in combination two groups each including a sound recording head, an erasing head, a reproducing head, and a magnetic carrier; a common mechanical driving means to simultaneously move said carriers in either direction in front of the associated heads; a microphone; means for selectively connecting said microphone to either of said recording heads; a sound diffusing means; means for selectively connecting said sound diffusing means to either of said reproducing heads; means for selectively connecting the reproducing head of either group with the recording head of the other group and simultaneously energizing the reproducing head and erasing head of either group and the recording head of the other gorup, in order to transfer said recording from either carrier to the other, and to erase the recording from either carrier immediately subsequent to being transferred from that carrier; said transfer and erasing being operable during movement of said carriers in either direction; means for stopping either said carrier while continuing the movement of the other carrier; and automatic control means located at a given position for operating said machine; whereby a continuous and corrected record may be impressed on one of the said carriers and any recording on the other carrier may be simultaneously completely erased.

5. A machine for producing a continuous and corrected recording of erasable signals on a single carrier comprising in combination two groups each including a sound recording head, an erasing head, a reproducing head, and a magnetic carrier; a common mechanical driving means to move said carriers in both directions in front of said associated heads; a microphone; means for selectively connecting said microphone to either of said recording heads; a sound diffusing means; means for selectively connecting said sound diffusing means to either of said reproducing heads; means for selectively connecting the reproducing head of one group with the recording head of the other group in order to transfer said recording from one carrier to the other, means for simultaneously energizing the reproducing head and the erasing head of one group and the recording head of the other group, including a common source of wiping current to erase the recording from either carrier immediately subsequent to being transferred from that carrier; said transfer and erasing being operable during movement of said carriers in either direction; means for stopping either said carrier while continuing the movement of the other carrier; means for superimposing a distinctive signal on said recording at any desired location on either carrier; and automatic control means located at a given position for operating said machine; whereby a continuous and corrected record with superimposed distinctive signals may be impressed on one of the said carriers and any recording on the other carrier may be simultaneously completely erased.

References Cited in the file of this patent

UNITED STATES PATENTS

| | | |
|---|---|---|
| 1,906,124 | Hopkins | Apr. 25, 1933 |
| 2,029,730 | Mallina | Feb. 4, 1936 |
| 2,209,157 | Glunt | July 23, 1940 |
| 2,333,235 | Clausen | Nov. 2, 1943 |
| 2,538,892 | Begun | Jan. 23, 1951 |
| 2,558,853 | Kappeler | July 3, 1951 |

FOREIGN PATENTS

| | | |
|---|---|---|
| 221,987 | Switzerland | Sept. 16, 1942 |
| 633,488 | Great Britain | Dec. 19, 1949 |